(12) United States Patent
Einsiedel

(10) Patent No.: US 7,188,864 B2
(45) Date of Patent: Mar. 13, 2007

(54) OCCUPANT PROTECTION DEVICE

(75) Inventor: Heinrich Einsiedel, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 25 days.

(21) Appl. No.: 11/207,202

(22) Filed: Aug. 19, 2005

(65) Prior Publication Data

US 2006/0038388 A1  Feb. 23, 2006

Related U.S. Application Data

(63) Continuation of application No. PCT/DE04/00331, filed on Dec. 19, 2004.

(30) Foreign Application Priority Data

Feb. 20, 2003   (DE)  ............................ 203 03 115 U

(51) Int. Cl.
*B60R 21/26* (2006.01)
(52) U.S. Cl. ...................... 280/740; 285/188
(58) Field of Classification Search ................ 280/740, 280/742, 737, 730.2, 728.2; 285/124.2–124.4, 285/188, 420; 102/530–531; 222/3; 137/355.16, 137/355.17, 355.18
See application file for complete search history.

(56) References Cited

U.S. PATENT DOCUMENTS

| | | | | |
|---|---|---|---|---|
| 3,354,517 A | * | 11/1967 | Levinsky | .................... 403/275 |
| 3,822,903 A | * | 7/1974 | McNeely et al. | ......... 285/124.2 |
| 4,079,970 A | * | 3/1978 | Brett | ........................ 285/136.1 |
| 4,213,640 A | * | 7/1980 | Miles | ....................... 285/124.2 |
| 4,546,524 A | * | 10/1985 | Kreft | ........................ 24/274 R |
| 4,774,792 A | * | 10/1988 | Ballance | .................... 52/285.2 |
| 5,131,630 A | * | 7/1992 | Nash | ......................... 256/12.5 |
| 6,070,903 A | * | 6/2000 | Beisswenger et al. | ...... 280/736 |
| 6,152,484 A | * | 11/2000 | Fischer et al. | ............. 280/736 |
| 6,179,323 B1 | | 1/2001 | Shellabarger | |
| 6,318,754 B1 | | 11/2001 | Einsiedel et al. | |
| 6,818,830 B2 | * | 11/2004 | O'Grady et al. | .......... 174/84 C |
| 2002/0125697 A1 | | 9/2002 | Heigl | |

FOREIGN PATENT DOCUMENTS

| | | |
|---|---|---|
| DE | 297 22 793 U1 | 4/1998 |
| DE | 198 34 690 A1 | 2/2000 |
| DE | 198 50 448 A1 | 5/2000 |
| DE | 201 03 892 U1 | 8/2001 |
| DE | 100 33 319 A1 | 1/2002 |
| DE | 202 16 611 U1 | 2/2003 |
| EP | 1 182 099 B1 | 2/2002 |
| WO | WO 99/30932 | 6/1999 |

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

An occupant-protection device including an airbag, and a gas generator connected to a filler tube for inflating the airbag. The filler tube has at least one inlet opening situated on its external wall between its two tube ends and is equipped with at least one adapter for allowing the flow of gas between the gas generator and the inlet opening.

20 Claims, 4 Drawing Sheets

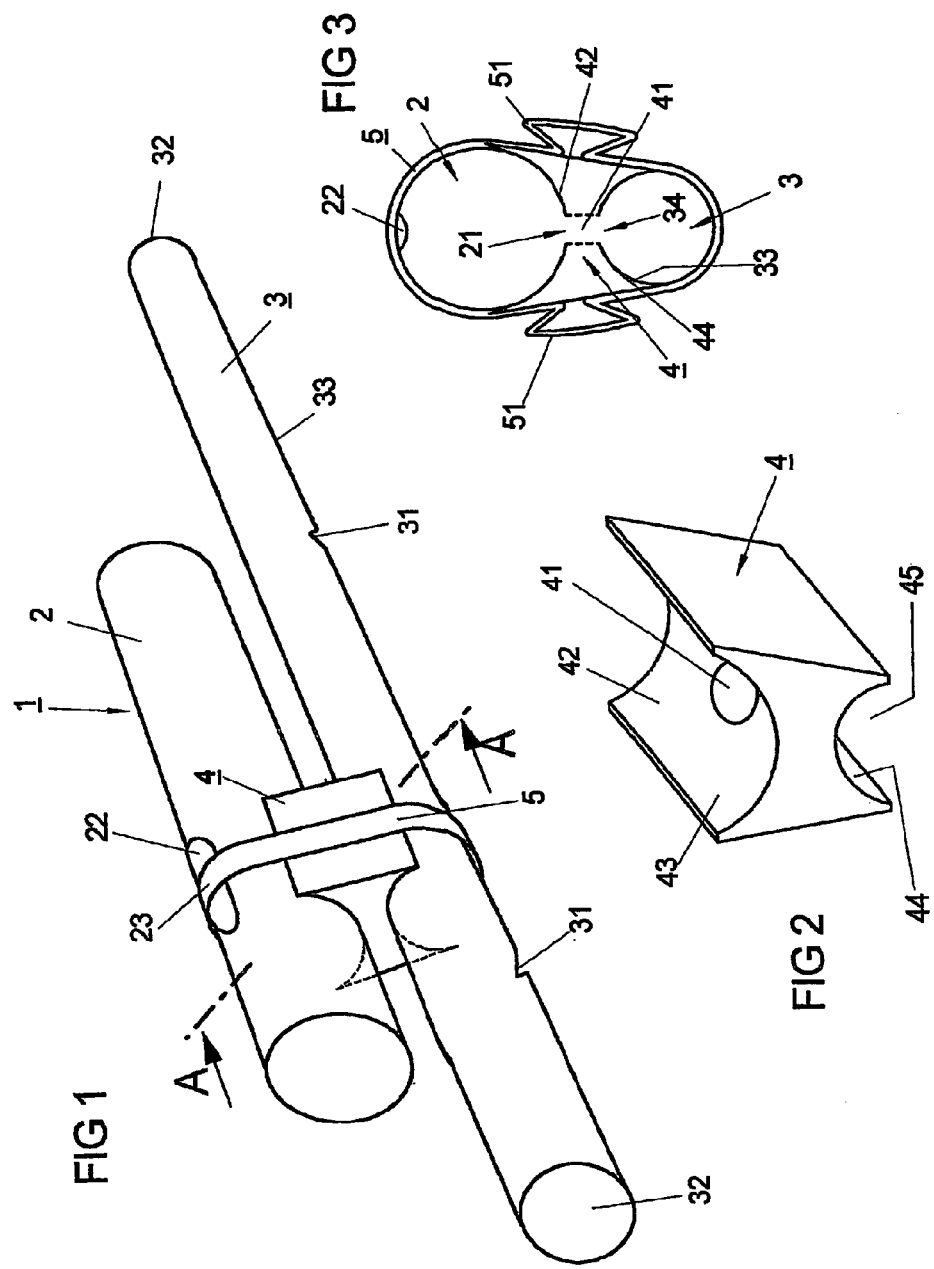

OCCUPANT PROTECTION DEVICE

CROSS-REFERENCE TO RELATED APPLICATIONS

This is a continuation of International Application PCT/DE2004/000331, which has an international filing date of Feb. 19, 2004. The International Application was not published in English, but was published in German as WO 2004/074049 A1 (incorporated by reference herein).

BACKGROUND

The invention relates to an occupant protection device.

A relevant occupant protection device is disclosed in German Utility Model DE 202 16 611 (incorporated by reference herein). In the case of this previously known occupant protection device, the gas generator has a connecting tube. A filling tube which is used for inflating an airbag of the occupant protection device is connected to this connecting tube. The connecting tube of the gas generator and the filling tube of the airbag are pushed one inside the other, whether in such a manner that the filling tube is pushed onto the connecting tube or conversely in such a manner that the connecting tube is pushed onto the filling tube. For the gastight connection of the two tubes, they are pressed together with plastic deformation.

SUMMARY

The invention is based, at least in part, on the object of specifying an occupant protection device, in which the connection between a gas generator and a filling tube is optimized. In particular, the capability of installing the occupant protection device in a motor vehicle is to be improved.

According to an embodiment of the invention, provision is made for the filling tube to have at least one inlet opening on its outer wall between its two tube ends, and for there to be at least one adapter which ensures a gas connection between the gas generator and the at least one inlet opening.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 shows an occupant protection device, according to an embodiment of the present invention.

FIG. 2 is a view of an adapter, according to an embodiment of the present invention.

FIG. 3 is a sectional view of the occupant protection device of FIG. 1 along line A—A, according to an embodiment of the present invention.

DESCRIPTION

Figure 4:
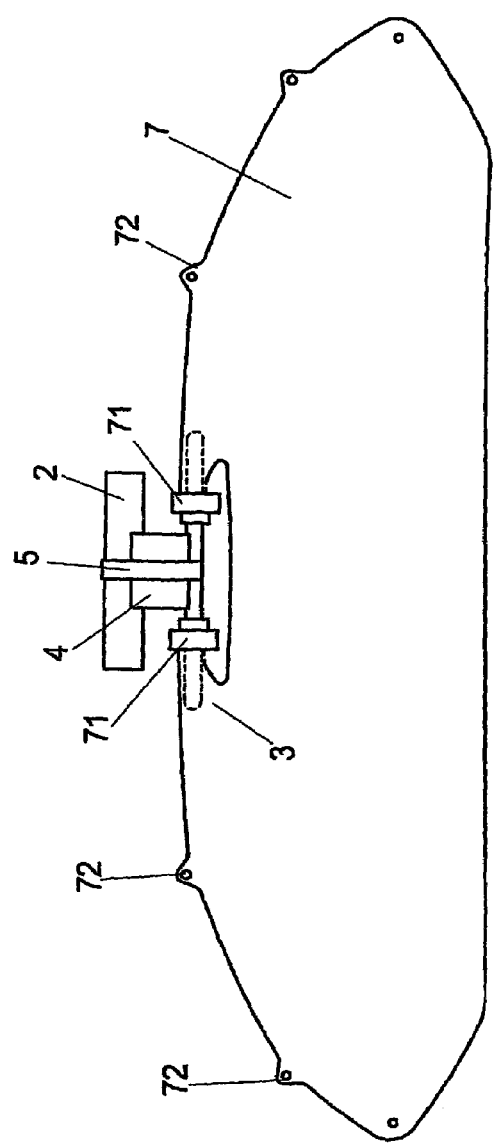
FIG. 4 is a side view of an airbag, according to an embodiment of the present invention.

A substantial advantage of the occupant protection device according to an embodiment of the invention is that it can be installed in a very variable and very simple manner in a motor vehicle. Since the connection between the gas generator and the filling tube is situated in the central region of the filling tube, it is namely possible—in contrast to the previously known connection of the gas generator at the end of the filling tube—to position the gas connecting point virtually as desired in the motor vehicle, depending on the specific requirements, and to define the position thereof in the motor vehicle with regard to the requirements. The freedom of being able to define the spatial position of the gas generator relative to the filling tube is therefore based specifically on the positioning of the gas connecting region in the central region of the filling tube instead of—as previously known—at the end of the tube.

A further substantial advantage of an occupant protection device according to an embodiment of the invention is that it is very space-saving; this is because the connection of the gas generator in the central region of the filling tube means that the gas generator and the filling tube can be oriented parallel to each other and, as it were, placed "one above the other". Since a gas generator usually has an elongate form, the parallel arrangement with respect to the filling tube means that installation space can be saved. A "parallel" arrangement of this type can be realized in a simple manner if the outlet opening(s) of the gas generator are arranged in the side region of the gas generator—adjacent to the side wall of the filling tube.

In order to avoid the gas of the gas generator being able to escape to the outside, it is regarded as advantageous if the gas connection between the gas generator and the inlet opening in the filling tube is sealed in such a manner that gas cannot escape to the outside.

The connection between the gas generator and the filling tube with the aid of the adapter can be fixed in a particularly simple and cost-effective manner using a clamping connection; it is therefore regarded as advantageous if the adapter is clamped between the gas generator and the outer wall of the filling tube by means of a clamping connection.

A simple clamping connection can be achieved, for example, by a clip; it is therefore advantageous if the gas generator, the adapter and the filling tube are connected by a clip, in particular are pressed onto one another.

If a releasable connection of the gas generator and the filling tube is desired, it is regarded as advantageous if a clip which can be tensioned by a tensioning screw is used, since clips of this type can readily be released again by release of the tensioning screws.

A very firm and very reliable connection between the gas generator, the adapter and the filling tube can preferably also be achieved with a single-eared or a multi-eared clamping clip, in particular a two-eared clip.

A gastight connection between the gas generator and the adapter can be achieved in a simple and therefore advantageous manner if, in the connecting region between the gas generator and the adapter, the outside of the adapter, which side faces the gas generator, is matched to the external shape of the gas generator. With appropriate matching to the external shaping, it is possible, for example, for the provision of separate sealing elements to be omitted.

In an analogous manner, it is regarded as advantageous if, in the connecting region between the outer wall of the filling tube and the adapter, the outside of the adapter, which side faces the outer wall of the filling tube, is matched to the external shape of the outer wall of the filling tube; this is because it is also true at the intersection between the adapter and the filling tube that it is possible, with appropriate matching to the external shape, if appropriate, for the provision of separate sealing elements to be omitted.

Particularly good sealing between the gas generator and the adapter can be achieved in an advantageous manner if the gas generator has—at least partially—a round or oval cross section and the outside of the adapter, which side faces the gas generator, has a channel-shaped recess which is complementary to the external shape of the gas generator.

In a corresponding manner, the connection between the adapter and the filling tube can also be optimized by namely the filling tube being provided—at least partially—with a round or oval cross section and the outside of the adapter, which side faces the filling tube, having a channel-shaped recess which is complementary to the external shape of the filling tube.

In addition, there can be an additional gas seal between the adapter and the gas generator or between the adapter and the filling tube for the purpose of sealing off the gas. A gas seal of this type can preferably be formed by an O-ring which is arranged in an annular groove of the adapter.

For the gas generator to be unaffected by a shearing force when not yet installed ("unfinished"), it is regarded as advantageous if the gas generator has a respective opposite outlet opening for each outlet opening provided for connection to the adapter or adapters. In the connection of the gas generator to the adapter, an opposite outlet opening of this type can be sealed, for example, by means of a clip. If appropriate, use can be made of an additional sealing element for sealing the opposite outlet opening(s).

An occupant protection device 1 can be seen in FIG. 1 which, inter alia, has a gas generator 2 and a filling tube 3. The filling tube 3 is provided on its outer wall 33 with outlet openings 31 from which gas can flow out of the filling tube 2 into an airbag (not illustrated in FIG. 1) of the occupant protection device. The two tube ends 32 of the filling tube 3 may be open or closed.

An adapter 4 which connects the gas generator 2 and the filling tube 3 to each other can also be seen in FIG. 1. The gas generator 2, the filling tube 3 and the adapter 4 are held together by a clip 5.

It can furthermore be seen in FIG. 1 that the clip 5 presses a sealing element 22 against the gas generator 2. The sealing element 22 thereby seals an outlet opening 23 of the gas generator 2.

FIG. 3 illustrates the occupant protection device 1 according to FIG. 1 in the cross section along the section line A, A. The gas generator 2 with its outlet opening 23 which is closed by the sealing element 22 can be seen in FIG. 3. The outlet opening 23 lies opposite an outlet opening 21 of the gas generator 2, which opening faces the adapter 4. In specific terms, the gas generator 2 is aligned in such a manner that its outlet opening 21 lies opposite a passage hole 41 of the adapter 4.

The filling tube 3 has an inlet opening 34 which is likewise assigned to the passage hole 41 of the adapter 4. Owing to this alignment of the gas generator 2 relative to the filling tube 3, it is ensured that gas of the gas generator 2 can pass out of the outlet opening 21 through the passage hole 41 and through the inlet opening 34 into the filling tube 3.

In order to provide a seal between the gas generator 2 and the adapter 4, the outside 42 of the adapter 4, which side faces the gas generator 2, is matched to the external shape of the gas generator 2. In the case of the exemplary embodiment according to FIGS. 1 to 4, the cross section of the gas generator 2 is essentially round or oval, with the result that the adapter likewise has an oval or round contour on its outside 42 facing the gas generator 2. In specific terms, the outside 42 of the adapter 4, which side faces the gas generator 2, is formed by a channel-shaped recess 43 onto which the gas generator 2 is placed. The channel-shaped recess 43 is illustrated in FIG. 2.

At the lower side of the adapter 4, the latter faces the filling tube 3; in order to ensure an essentially gastight connection between the filling tube 3 and the adapter 4, in the connecting region between the filling tube 3 and the adapter 4, the outside 44 of the adapter 4, which side faces the outer wall 33 of the filling tube 3, is matched to the external shape of the outer wall 33 of the filling tube 3. A three-dimensional illustration of the connecting region between the filling tube 3 and the adapter 4 can readily be seen in FIG. 2; thus, a channel-shaped recess 45 can be seen in FIG. 2, with which the adapter 4 is placed onto the filling tube 3, which is circular in cross section.

The adapter 4 is of single-piece design. The channel-shaped recesses 43 and 45 are arranged here on the opposite outsides 42 and 44 of the adapter. In this case, the passage hole 41 is designed as a drilled passage bore and extends between the two channel-shaped recesses 43 and 45.

The specific configuration of the clip 5 can also be seen in FIG. 3. The clip 5 can be, for example, a clip which can be tensioned by a tensioning screw; however, in the case of the exemplary embodiment according to FIG. 3, it is a two-eared clamping clip in which the clip 5 is pressed together at two ear regions 51 and placed under tension. This pressing together of the clip 5 in the region of the ears 51 causes the gas generator 2, the adapter 4 and the filling tube 3 to be pressed together. Owing to the corresponding matching in terms of shape in the connecting region between the gas generator 2 and the adapter 4, on the one hand, and the adapter 4 and the filling tube 3, on the other hand, an essentially gastight connection is ensured. In order to ensure a particularly gastight sealing between the gas generator 2, the adapter 4 and the filling tube 3, additional seals may also be provided. Seals of this type may be formed, for example, by o-rings which are inserted into corresponding guide grooves—for example in the adapter 4.

The occupant protection device 1 according to FIGS. 1 to 3 can be seen in FIG. 4 in the assembled state after an airbag 7 has been connected to the filling tube 3. The airbag 7 is connected to the filling tube 3 by means of two hose clips 71.

The gas generator 2 which is connected in a gastight manner to the filling tube 3 by means of the adapter 4 and the clip 5 can also be seen in FIG. 4.

It can readily be seen in FIG. 4 that the positioning of the gas generator 2 relative to the filling tube 3 is virtually as desired; this is because the gas generator 2 can be fastened to the filling tube 3 at any desired point of the outer wall 33 of the filling tube 3. It is therefore not required, in the case of the occupant protection device according to FIGS. 1 to 4, to place the gas generator 2 in the region of the one of two tube ends 32 of the filling tube 3.

The airbag 7 can be fastened to a vehicle body with fastening loops 72.

Figure 5:
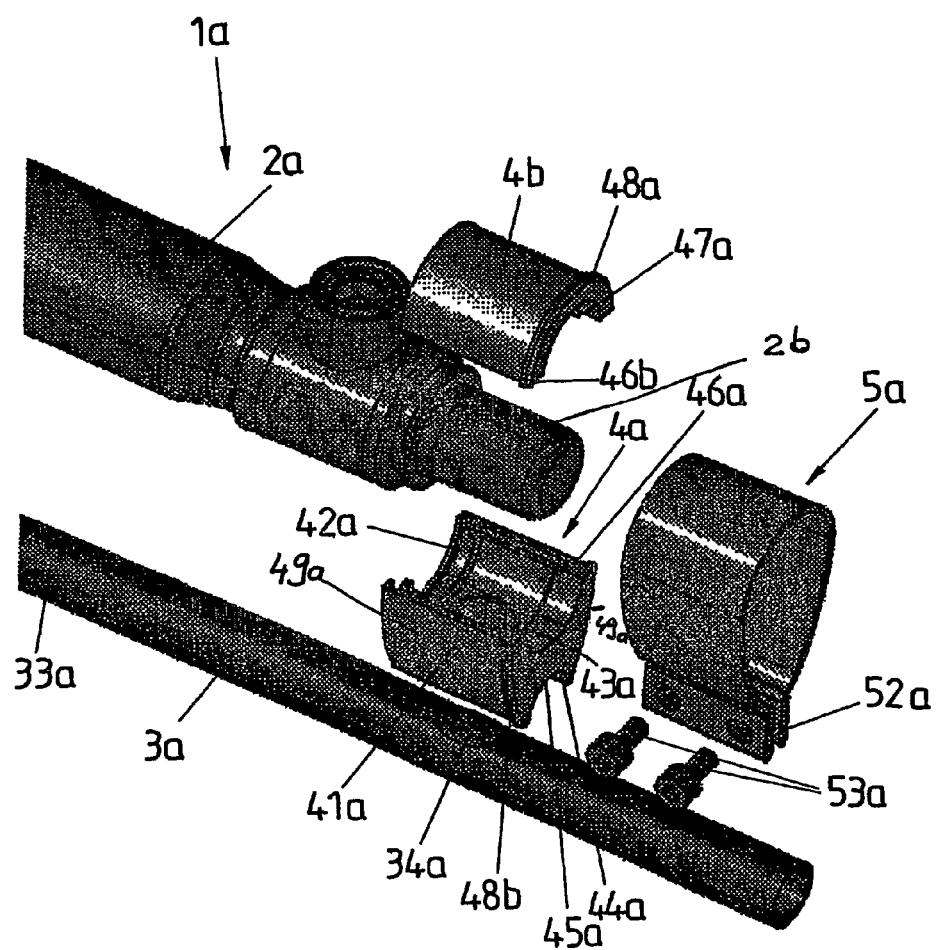
FIG. 5 is an exploded view of an occupant protection device, according to an embodiment of the present invention.
Figure 6:
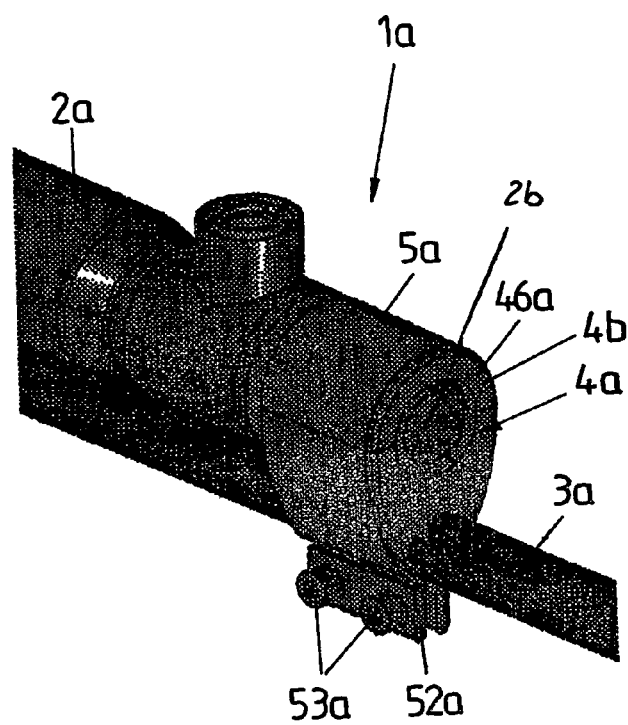
FIG. 6 is an elevated view of an occupant protection device, according to an embodiment of the present invention.
Figure 7:
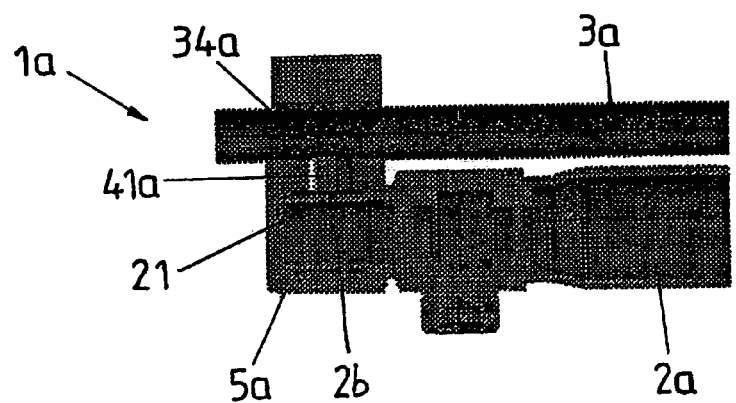
FIG. 7 is a sectional side view of an occupant protection device, according to an embodiment of the present invention.

The exemplary embodiment illustrated in FIGS. 5 to 7 illustrates a development of the first embodiment. In the case of this embodiment, an adapter 4a is arranged between a gas generator 2a and a filling tube 3a and connects outlet openings 21 of the gas generator 2a to an inlet opening 34a of the filling tube 3a. Gas generator 2a and filling tube 3a have all of the features of corresponding components of the first exemplary embodiment.

The adapter 4a is essentially designed in an identical manner to the adapter 4. It likewise comprises two channel-like recesses 43a, 45a which are arranged on opposite outsides 42a, 44a of the adapter 4a. In this case, the outside 42a of the adapter 4a faces the gas generator 2a and the outside 44a faces the outer wall 33a of the filling tube 3a. Two longitudinal sides 49a of the adapter 4a extend along the longitudinal axis of the filling tube 3a and of the gas generator 2a in each case between the channel-like recesses 43a, 45a. These longitudinal sides 49a are curved outward facing away from the adapter. On one end side 49b of the adapter 4a, which side faces away from the gas generator 2a and extends between the two longitudinal sides 49a, a flange 48b is formed which protrudes over the longitudinal sides 49a. A respective supporting surface 46a of the adapter, which surface faces in the direction of the gas generator 2a, is formed on the longitudinal-side edges of the channel-shaped recess 43a. Between the channel-like recesses 43a, 45a, a passage hole 41a which is designed as a drilled passage hole extends in the interior of the adapter 4a. The adapter 4a is of single-piece design.

The adapter 4a is arranged between the filling tube 3a and the gas generator 2a in such a manner that the channel-like recess 43a of the outside 42a of the adapter 4a receives the gas generator 2a. In this case, the gas generator 2a is positioned in such a manner that the outlet openings 21 of the gas generator 2a are situated above the passage hole 41a of the adapter 4a. That section of the gas generator 2a which is connected to the adapter 4a is accommodated with approximately half of its circumference in the channel-shaped recess 43a. The opposite, channel-like recess 45a of the adapter 4a accommodates the filling tube 3a, with an inlet opening 34a of the filling tube 3a being situated above the passage hole 41a of the adapter 4a.

In order to fasten the adapter 4a between the gas generator 2a and the filling tube 3a, an adapter covering 4b is placed onto the connecting section of the gas generator 2a, which section is not enclosed by the adapter 4a. Said adapter covering is of semi-cylindrical design. A semicircular flange 48a is formed on an end side of the half cylinder. The extent of the adapter covering 4b in the direction of the longitudinal axis of the half cylinder corresponds to that of the adapter 4a. On that side of the adapter covering 4b which faces the gas generator 2a, supporting surfaces 46b are formed toward both longitudinal sides of the channel-shaped recess of the side 47a and are designed corresponding to the supporting surfaces 46a of the adapter.

In the fitted state, the adapter covering 4b encloses the connecting section of the gas generator 2a, which section is not enclosed by the channel-shaped recess 43a of the adapter 4a. In this case, the supporting surfaces 46b of the adapter covering 4b rest on the supporting surfaces 46a of the adapter 4a. The adapter covering 4b forms, together with the adapter 4a, by means of their outer surfaces 47a, 42a which face the gas generator 2a, a flow passage around the outlet section 2b of the gas generator 2a, so that gas can flow out of the outlet openings 21 and further outlet openings, which are situated opposite the latter or are distributed around the outlet section 2b, can flow into this flow passage. However, there is also the possibility of the adapter covering 4b sealing outlet openings (not illustrated) of the gas generator 2a that preferably lie opposite the outlet openings 21. The bearing flanges 48a, 48b of the adapter 4a and of the adapter covering 4b rest on each other at their edges. Adapter 4a and adapter covering 4b together, in the fitted state, have an approximately drop-shape design in cross section.

In order to fix the adapter 4a and the adapter covering 4b, a clip 5a is provided which, in the fitted state, bears against the outer circumference of the adapter 4a and of the adapter covering 4b. The curvature of the outsides 49a of the adapter 4a enables the introduction of force into the adapter 4a and therefore into the clip 5a during the inflation of the airbag 7 to be optimized. In order to secure a precise positioning on the adapter 4a and the adapter covering 4b and in order to prevent a lateral slipping of the clip 5a on the adapter 4a and the adapter covering 4b, the clip 5a bears against the lateral flanges 48a, 48b. The clip 5a has a two-part fastening section 52a which, in the fitted state, is arranged on that side of the filling tube 3a which faces away from the adapter 4a. The two parts of the fastening section 52a are connected to each other by fastening elements 53a, in particular bolts. In the fitted state, the clip 5a completely encloses the arrangement of adapter covering 4b, gas generator 2a, adapter 4a and filling tube 3a. However, a partial enclosing is likewise conceivable.

The connection of the embodiment of FIGS. 5 to 7 to an airbag 7 can take place in a similar or identical manner as in the first embodiment.

The priority document, DE 203 03 115.6, filed on Feb. 20, 2003, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device, comprising:
   a gas generator;
   a filling tube including an outer wall and two ends which is connected to the gas generator and is intended for inflating an airbag of the occupant protection device, wherein the filling tube includes at least one inlet opening on the outer wall located between the two ends;
   an adapter which ensures a gas connection between the gas generator and the at least one inlet opening; and
   an adapter covering that rests on the adapter, with an outlet region of the gas generator being enclosed by the adapter and the adapter covering.

2. The occupant protection device of claim 1, wherein the adapter is clamped between the gas generator and the outer wall of the filling tube by a clamping connection.

3. The occupant protection device of claim 1, wherein a gas connection between the gas generator and the inlet opening is sealed in such a manner that gas cannot escape.

4. The occupant protection device of claim 1, wherein, in a connecting region between the gas generator and the adapter, an outside surface of the adapter that faces the gas generator is matched to the external shape of the gas generator.

5. The occupant protection device of claim 1, wherein, in a connecting region between the outer wall of the filling tube and the adapter, an outside surface of the adapter that faces the outer wall of the filling tube is matched to the external shape of the outer wall of the filling tube.

6. The occupant protection device of claim 1, wherein the gas generator includes at least a partial round or oval cross section, and an outside surface of the adapter that faces the gas generator includes a channel-shaped recess which is complementary to the external shape of the gas generator.

7. The occupant protection device of claim 1, wherein the filling tube includes at least a partial round or oval cross section and an outside surface of the adapter that faces the filling tube includes a channel-shaped recess which is complementary to the external shape of the filling tube.

8. The occupant protection device of claim 1, wherein the adapter includes channel-shaped recesses that lie opposite one another.

9. The occupant protection device of claim 1, wherein the adapter includes a gas seal in a connecting region to the gas generator and/or in a connecting region to the filling tube.

10. The occupant protection device of claim 9, wherein the gas seal is formed by an O-ring which is arranged in an annular groove of the adapter.

11. The occupant protection device of claim 1, wherein the adapter and the adapter covering each have a bearing flange.

12. The occupant protection device as claimed claim 11, wherein the adapter and the adapter covering are surrounded by a clip so that the adapter and the adapter covering are fastened to the gas generator and to the filling tube by the clip.

13. The occupant protection device of claim 12, wherein the clip rests against the bearing flanges.

14. The occupant protection device of claim 1, wherein outside surfaces of the adapter that do not rest directly on the gas generator or the filling tube are of outwardly curved design.

15. The occupant protection device of claim 1, wherein the adapter and the adapter covering form a flow space wherein the outside of the adapter and the outside of the adapter covering face the outlet region of the gas generator.

16. An occupant protection device, comprising:

a gas generator;

a filling tube including an outer wall and two ends which is connected to the gas generator and is intended for inflating an airbag of the occupant protection device, wherein the filling tube includes at least one inlet opening on the outer wall located between the two ends; and an adapter which ensures a gas connection between the gas generator and the at least one inlet opening, wherein the gas generator includes at least one outlet opening and an additional opening lying opposite the one outlet opening, and in that a clip at least partially seals the opposite, additional outlet opening.

17. The occupant protection device of claim 16, wherein the gas generator, the adapter and the filling tube are connected by the clip.

18. The occupant protection device of claim 17, wherein the clip is tensioned by a tensioning screw.

19. The occupant protection device of claim 17, wherein the clip is a single-eared or a multi-eared clip.

20. The occupant protection device of claim 16, further comprising a sealing element for sealing the opposite outlet opening.

* * * * *